United States Patent [19]
Motoyama et al.

[11] Patent Number: 5,190,006
[45] Date of Patent: Mar. 2, 1993

[54] INJECTION ARRANGEMENT FOR IMPROVING FUEL CONSUMPTION

[75] Inventors: Yu Motoyama; Ryusuke Kato, both of Iwata, Japan

[73] Assignee: Yamaha Hatsudoki Kabushiki Kaisha, Iwata, Japan

[21] Appl. No.: 673,642

[22] Filed: Mar. 22, 1991

[30] Foreign Application Priority Data

Mar. 23, 1990 [JP] Japan .................................. 2-75308

[51] Int. Cl.⁵ .............................................. F02D 43/00
[52] U.S. Cl. ................................ 123/305; 123/65 PE; 123/73 C
[58] Field of Search ................ 123/294, 65 PE, 73 C, 123/305, 295

[56] References Cited

U.S. PATENT DOCUMENTS 4,807,572  2/1989  Schlunke ........................... 123/73 C
4,920,932  5/1990  Schlunke ........................ 123/65 PE Primary Examiner—Andrew M. Dolinar
Attorney, Agent, or Firm—Ernest A. Beutler

[57] ABSTRACT

A fuel injection system for engines for improving performance and fuel economy. The fuel injector controlled along with an exhaust port timing control mechanism so that fuel injected into the engine will not pass out of the exhaust port under most engine running conditions. The invention is disclosed particularly in conjunction with a two cycle crankcase compression engine wherein it has particular utility. The timing of the opening and closing of the exhaust port is changed by means of an exhaust control valve that obstructs the exhaust port under certain running conditions so as to delay its opening and closing.

33 Claims, 3 Drawing Sheets

INJECTION ARRANGEMENT FOR IMPROVING FUEL CONSUMPTION

BACKGROUND OF THE INVENTION

This invention relates to a fuel injection system for an internal combustion engine and more particularly to an improved injection arrangement for improving fuel consumption and reducing hydrocarbon (HC) emissions.

The advantages of direct cylinder fuel injection are well known. However, one disadvantage with direct cylinder fuel injection is that under some running conditions, it may actually deteriorate fuel economy. The reason for this is due to the overlap cycle of the opening of the exhaust port and the period of fuel injection. Frequently, the flow of the charge in the combustion chamber can cause a portion of the directly injected fuel to be swept through the exhaust port during such time as fuel is being injected and the exhaust port is open thus reducing fuel economy and increasing HC emissions.

The aforenoted problem is particularly acute in conjunction with two cycle engines due to the fact that fuel injection and exhaust port openings frequently have substantial overlap. Although direct cylinder injection has been proposed as a means of improving the fuel economy in a two cycle engine, the problem of having injected fuel pass directly out the exhaust port is a particular problem in direct cylinder injected two cycle engines.

It is, therefore, a principal object of this invention to provide an engine and method of operating it embodying fuel injection and insuring that fuel will not pass out of the exhaust port during the time when the exhaust port is open.

It is a further object of this invention to provide an improved two cycle direct injected engine and method of operating it wherein fuel economy can be improved.

It is a further object of this invention to provide an improved two cycle engine and injection system wherein injected fuel will not pass out of the exhaust port.

SUMMARY OF THE INVENTION

A first feature of this invention is adapted to be embodied in an internal combustion engine having a combustion chamber, an exhaust port for exhausting gases from the combustion chamber and exhaust port timing means for effecting a change in the timing the exhaust port is open. Fuel injection means are provided for injecting fuel directly into the combustion chamber. In accordance with the invention, means are provided for interrelating the exhaust port timing means and the fuel injection means for precluding the exit of fuel injected into the combustion chamber from the exhaust port under at least certain running conditions.

Another feature of the invention is adapted to be embodied in a method of operating an engine having a combustion chamber, an exhaust port for exhausting gases from the combustion chamber and exhaust port timing means for effecting a change in the timing when the exhaust port is open. Fuel injection means are provided for injecting fuel directly into the combustion chamber. In accordance with this feature of the invention, the exhaust port timing means is interrelated with the fuel injection means to insure that fuel injected into the combustion chamber will not exit from the exhaust port under at least certain running conditions.

DETAILED DESCRIPTION OF THE PREFERRED EMBODIMENT OF THE INVENTION

Figure 1:
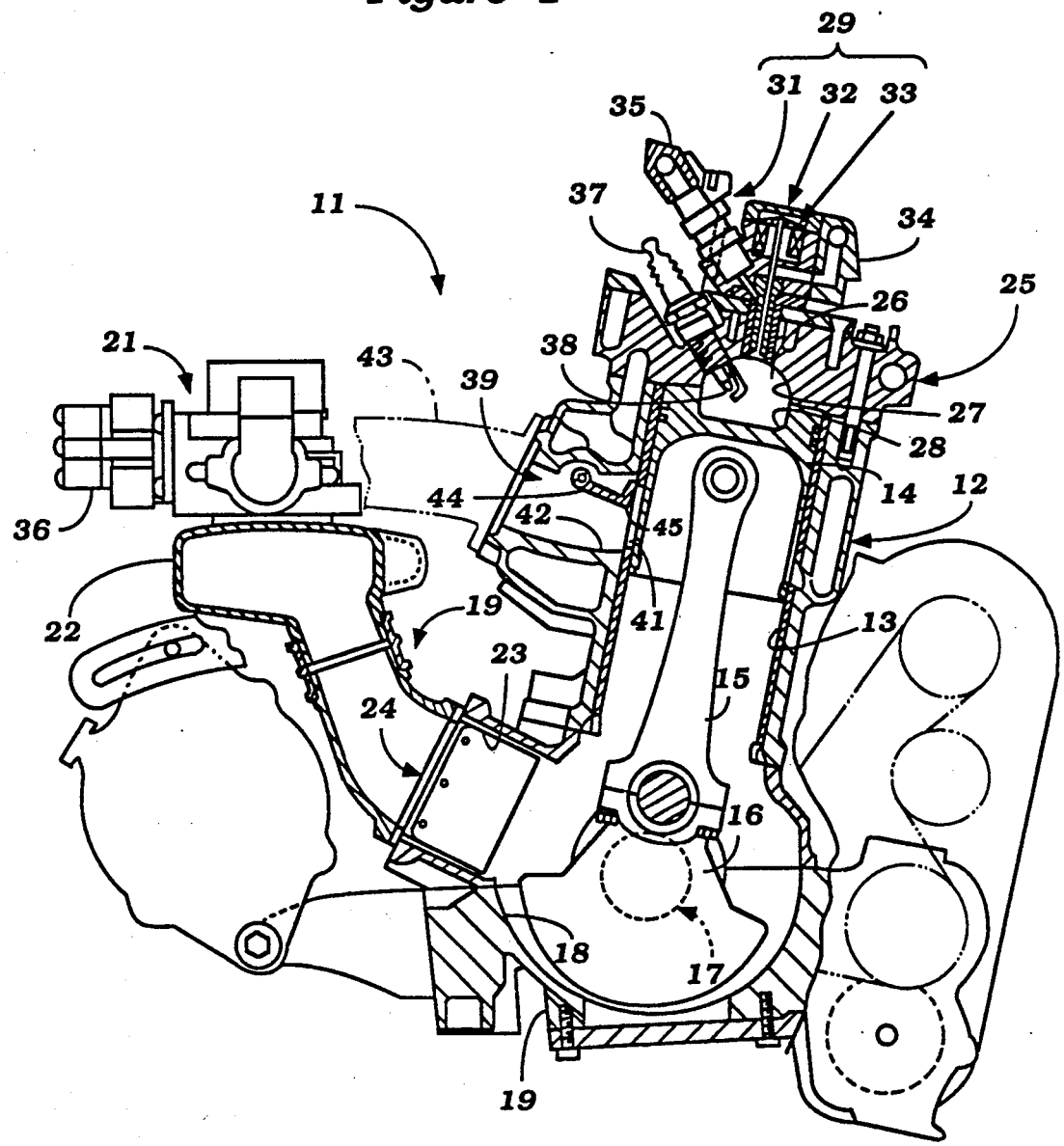
FIG. 1 is a cross sectional view taken through a single cylinder of a multiple cylinder engine constructed and operating in accordance with the principles of the invention.

Referring now in detail to the drawings and initially primarily to FIG. 1, an internal combustion engine having a fuel injection system and exhaust control system constructed in accordance with an embodiment of the invention is identified generally by the reference numeral 11. In the illustrated embodiment, the engine 11 is of the three cylinder in line type operating on a spark ignited two cycle crankcase compression principle. Although the invention is described in conjunction with this type of reciprocating engine, it should be readily apparent to those skilled in the art that the invention may be utilized with engines having other cylinder numbers, other cylinder configurations and operating on other principles. However, the invention does have particular utility in two cycle engines. Also, since the invention is directed primarily to the injection system and exhaust control for the engine 11, only a cross sectional view of a single cylinder of the engine is believed to be necessary to enable those skilled in the art to practice the invention.

The engine 11 includes a cylinder block assembly 12 in which individual cylinder liners are provided so as to form cylinder bores 13. Pistons 14 reciprocate in these cylinder bores and are connected by means of connecting rods 15 to the individual throws 16 of a crankshaft 17. The crankshaft 17 is rotatably journaled within a crankcase chamber 18 formed by the skirt portion of the cylinder block 12 and by a crankcase member 19 that is affixed to the cylinder block in a suitable manner.

As is typical with two cycle engine practice, the individual crankcase chambers 18 associated with each of the cylinder bores 13 are isolated from each other and an air charge is delivered to the individual crankcase chambers 18 by an induction system, indicated generally by the reference numeral 19. This induction system 19 includes a throttle body 21 in which a flow controlling throttle valve (not shown) is positioned. The throttle body 21 serves an intake manifold 22 that has individual outlet ports that cooperate with inlet ports 23 formed in the crankcase chambers 18. Reed type check valves 24 are provided in each of the intake ports 23 so as to preclude against reverse flow from the crankcase chambers 18 to the induction system 19 when the charge is being compressed in the crankcase chambers 18 by the downward movement of the pistons 14.

A cylinder head assembly, indicated generally by the reference numeral 25 is affixed to the cylinder block 12 in a known manner. A combustion chamber, indicated by the reference numeral 26 is formed by a recess 27 of the cylinder head 25, a bowl 28 formed in the heads of the pistons 14 and by the cylinder bores. The air charge compressed in the crankcase chamber 18 is transferred to the combustion chamber 26 through one or more scavenge ports (not shown).

A fuel air injector assembly, indicated generally by the reference numeral 25 is affixed to the cylinder block 12 in a known manner. A combustion chamber, indicated by the reference numeral 26 is formed by a recess 27 of the cylinder head 25, a bowl 28 formed in the heads of the pistons 14 and by the cylinder bores. The air charge compressed in the crankcase chamber 18 is transferred to the combustion chamber 26 through one or more scavenge ports (not shown).

A fuel air injector assembly, indicated generally by the reference numeral 29 is provided for injecting fuel and air under high pressure into the combustion chamber 26 at a timing relationship as will be described. The fuel air injector 29 includes a fuel injector portion 31, a solenoid control valve 32 for opening an injector valve to admit the fuel and air charge into the combustion chamber and which includes an electrical solenoid 33. An air manifold 34 is affixed to a side of the injector units 29 and supplies air under pressure. A fuel rail 35 supplies fuel to the individual fuel injectors 31. Although the construction of the fuel air injector 29 may be of any known type and, if desired, the invention can be utilized in conjunction with an injector that injects only fuel, the type shown in copending application Ser. No. 608,682, entitled "Air Fuel Injection System", filed Nov. 2, 1990 in the name of Junichi Kakau, and assigned to the Assignee of this application may be advantageously employed. Reference may be had to that copending application, the disclosure of which is incorporated herein by reference, for the details of the fuel air injection unit 29.

In addition, a sub injector, indicated generally by the reference numeral 36, may be provided in the throttle body 21 for supplying fuel under certain running conditions as also described in the aforenoted copending application.

The fuel air charge which is then present in the combustion chamber 26 is fired by a spark plug 37 that has its spark gap 38 extending into the combustion chamber. The spark plug 37 is fired by means of a suitable ignition system and at a timing as is appropriate to achieve the desired engine performance.

As the charge burns and expands, the piston 14 will be driven downwardly. The burnt charge is then discharged through an exhaust passage 39 and which comprises a port opening 41 formed in the cylinder liner and which cooperates with an exhaust passage 42 formed in the cylinder block 12. The exhaust passage 42 terminates at an exhaust manifold 43 which delivers the exhaust gases to an exhaust system (not shown) for discharge to the atmosphere, silencing and catalytic treatment, if desired.

In accordance with an important feature of the invention, an exhaust control valve, indicated generally by the reference numeral 44, is pivotally supported in the cylinder block 12 and has a valving portion 45 that is adapted to control the effective area of the exhaust port 41 and also the timing of its opening. As may be best seen in FIG. 2, the exhaust control valves 44 for each cylinder of the engine are affixed to a common control valve shaft 46 in an appropriate manner. The control valve shafts 46 are all connected to a servo mechanism 47 that receives a control signal S from a control unit 48 so as to vary the exhaust port timing, in a manner to be described. Although the manner of control may vary, in the illustrated embodiment, the control unit 48 receives input signals from a throttle position sensor 49 and an engine speed sensor 51.

It should be readily apparent that when the exhaust control valve 44 is in its fully opened position as shown in the solid line view of FIG. 2, the exhaust port 41 will be opened at an earlier crank angle as the piston 14 descends and will be closed at a later crank angle as the piston 14 ascends, than when the exhaust control valve 44 is in its fully advanced position, as shown in the phantom line view of FIG. 2 the solid line view of FIG. 1.

Figure 2:
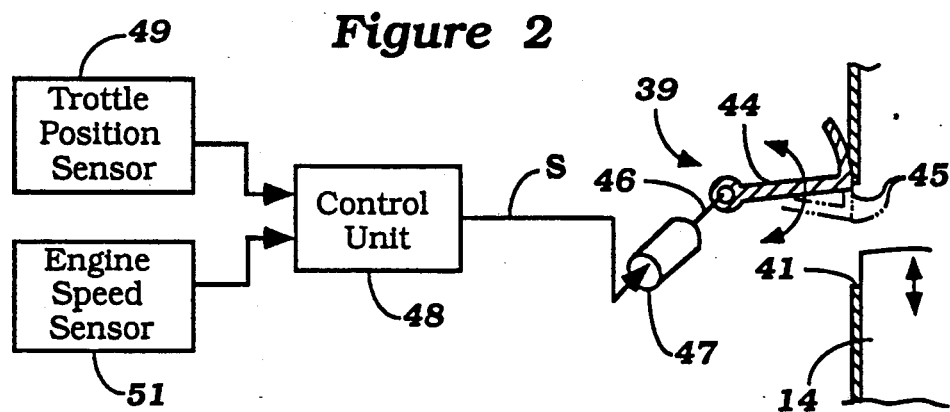
FIG. 2 is an enlarged cross sectional view and partially schematic view showing the control arrangement for the exhaust port timing device.
Figure 4:
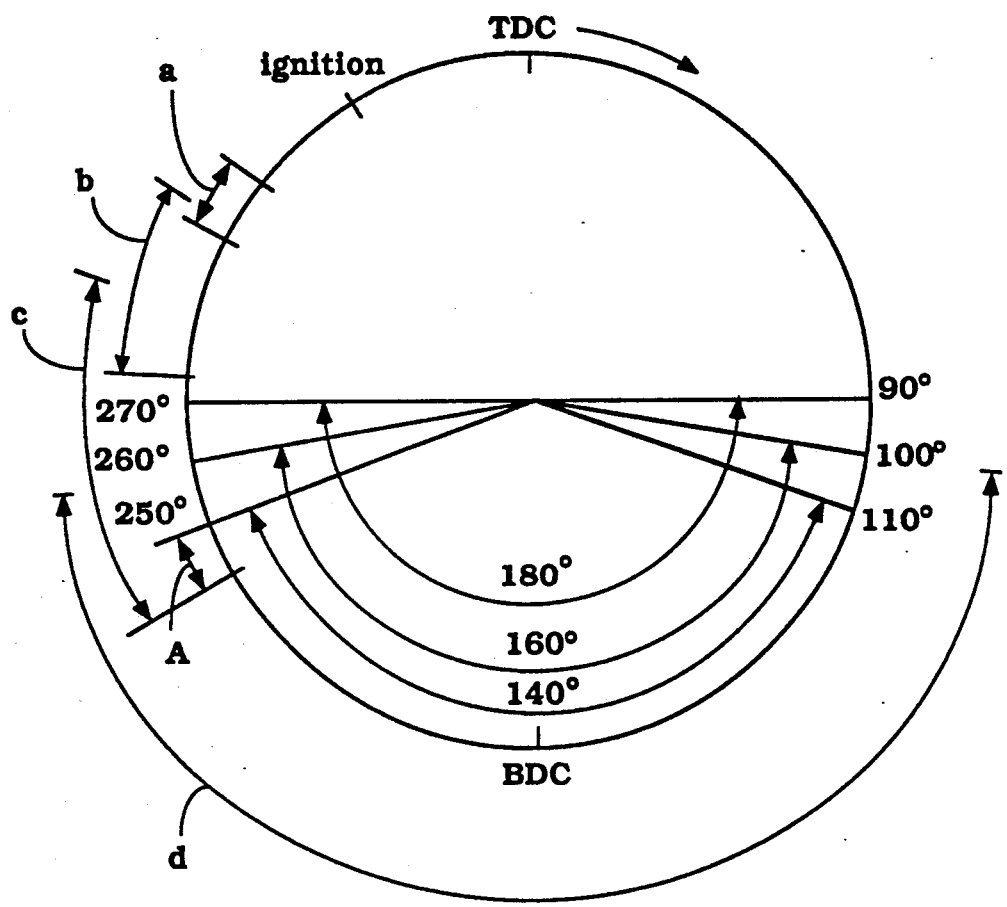
FIG. 4 is a timing diagram showing the timing of fuel injection under varying load and speed conditions and also the timing of the exhaust port opening.

Referring to the timing diagram of FIG. 4, the various stages of exhaust port opening are described ranging from a minimum opening area of 140° of crank rotation and opening at 110° after top dead center, which represents the position shown in the phantom line view of FIG. 2 and the solid line view of FIG. 1 to a maximum timing of 180° of exhaust port opening beginning at 90° after top dead center.

It should be readily apparent that the greater degree of exhaust port opening, the better the scavenging of the combustion chamber from a previous burned cycle. However, as the exhaust port is opened for a greater period of time and at an earlier time period, there is a risk that the fresh fuel charge delivered by the injector unit 29 may pass out of the exhaust port 41 and HC emissions will increase. The exhaust control valve 44 is operated in response to certain engine running conditions so as to preclude this without sacrificing the maximum speed performance of the engine.

Figure 5:
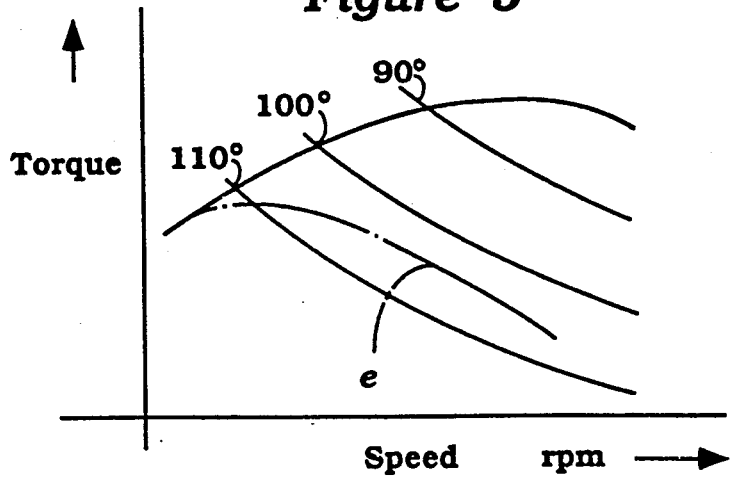
FIG. 5 is a graphic view showing the torque curve for the engine and also families of curves under varying exhaust port timing conditions.

FIG. 5 is a torque curve for the engine and shows families of torque curves at various exhaust port openings. As may be seen from the curve e, when the exhaust port 41 is opened at a delayed time and with minimum amount of duration, the torque curve falls off rapidly as speed increases. By progressively opening the exhaust control valve 44 as the speed and the load of the engine increases, the solid line torque curve may be attained so as to obtain maximum performance. However, the injection unit 29 is controlled in a manner now to be described so as to prevent the loss of fuel from the exhaust port, particularly at low speeds and low loads and the resulting poor fuel economy and increased HC emissions. Therefore, by interrelating control of the exhaust control valve 44 and the timing of the injection from the injector unit 29, good output can be achieved without adversely affecting fuel consumption.

Figure 3:
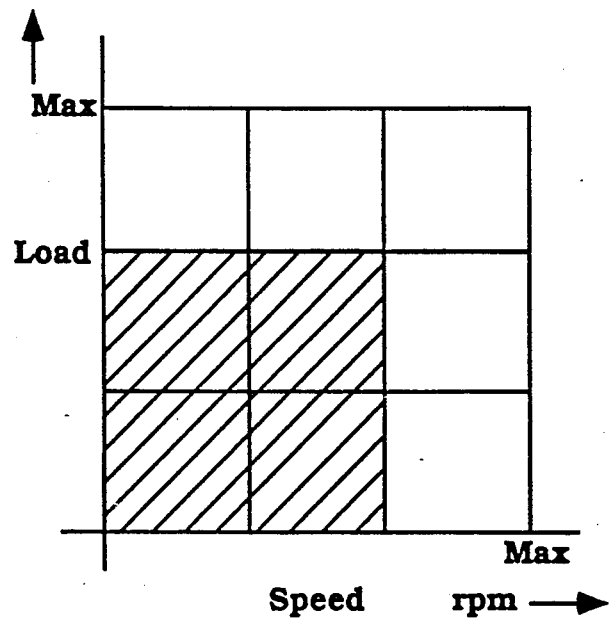
FIG. 3 is a graphic view showing the interrelation of engine speed to load and the time when the timing of the exhaust port opening is adjusted in accordance with the invention.

FIG. 3 is a graphic view depicting how the strategy of the program is operated so that the exhaust control valve is maintained in its timing retarding position during low speed and low load and the fuel injection is retarded under these same conditions so as to insure that fuel injected into the combustion chamber 26 will not be driven out of the exhaust port 41 during the scavenging operation. Referring to FIG. 4, it will be seen that the fuel injection timing a employed at low load, low engine speed conditions is such that fuel injection is begun long after the exhaust port is closed and is terminated long before the exhaust port is opened.

As the load increases at low speeds or as the load maintains low and the engine speed increases, the injection timing curve b is followed wherein injection is begun earlier and finished later, all while the exhaust control valve 44 is in its closed position.

As the engine reaches middle-load, middle speed conditions, the injection timing curve c is followed where timing of injection begins before the exhaust port is fully closed but is stopped long before the exhaust port reopens. In this way, it will be insured that the injected charge of fuel will not reach the exhaust port at anytime when it is opened. There is an overlap period A, but this occurs at the beginning of injection and at the close of the exhaust port so as to insure that fuel will not flow out of the exhaust port and HC emissions will be controlled effectively. Of course, the exhaust control valve begins to move toward its less retarded position and longer duration after the engine load reaches this condition.

At maximum speed and maximum load, the timing curve d is followed wherein fuel is injected during the time when the exhaust port is opened, but fuel injection is terminated long before the beginning of the next opening of the exhaust port and thus further insuring that the scavenge air flow will not force any fuel out of the exhaust port. Therefore, by advancing the timing of the beginning of injection and the duration of injection as the speed and load increases, while at the same time advancing the time when the exhaust port opens and increasing its duration as the load and speed increases, good performance can result without resulting in poor fuel economy or high HC emissions, particularly at low speeds and low loads. Of course, the foregoing description is that of a preferred embodiment of the invention. Various changes and modifications may be made without departing from the spirit and scope of the invention, as defined by the appended claims.

We claim:

1. An internal combustion engine having a combustion chamber, an exhaust port for exhausting gases from said combustion chamber, exhaust port timing means including a valve which progressively opens as the speed and load of the engine increase for effecting a change in the timing when said exhaust port is open, fuel injection means for injecting fuel directly into said combustion chamber, and means for interrelating said exhaust port timing means and said fuel injection means for substantially precluding the exit of fuel injected into the said combustion chamber from said exhaust throughout the entire range of speed and load of the engine to produce the desired torque characteristics.

2. An internal combustion engine as set forth in claim 1 wherein the time and duration of fuel injection is also varied in response to engine speed and load requirements.

3. An internal combustion engine as set forth in claim 2 wherein the fuel injection initiation is advanced and duration is also increased as the engine speed and load increases.

4. An internal combustion engine as set forth in claim 2 wherein the timing of the fuel injection and exhaust port opening and closing at low load, low speed conditions is such that fuel injection is begun long after the exhaust port is closed and is terminated long before the exhaust port is open.

5. An internal combustion engine as set forth in claim 4 wherein the timing of the fuel injection and exhaust port opening and closing is such that at mid range, mid speed conditions fuel injection begins before the exhaust port is fully closed but is stopped long before the exhaust port again reopens.

6. An internal combustion engine as set forth in claim 2 wherein the timing of the fuel injection and exhaust port opening and closing is such that at mid range, mid speed conditions fuel injection begins before the exhaust port is fully closed but is stopped long before the exhaust port again reopens.

7. An internal combustion engine as set forth in claim 6 wherein the timing of fuel injection and exhaust port opening and closing is such that at maximum speed and maximum load fuel is injected during the time when the exhaust port is open but is terminated long before the beginning of the next opening of the exhaust port.

8. An internal combustion engine as set forth in claim 2 wherein the timing of fuel injection and exhaust port opening and closing is such that at maximum speed and maximum load fuel is injected during the time when the exhaust port is open but is terminated long before the beginning of the next opening of the exhaust port.

9. An internal combustion engine as set forth in claim 1 wherein the engine is a reciprocating, two cycle, crankcase compression internal combustion engine having spark ignition and wherein the fuel injection is completed under at least certain running condition before the spark plug is fired.

10. An internal combustion engine as set forth in claim 9 wherein the exhaust port is not opened until at least 90° of crankshaft revolution after the fuel injection has been completed under the certain running condition.

11. An internal combustion engine as set forth in claim 10 wherein the exhaust port timing means comprises an exhaust control valve for controlling the effective opening area of the exhaust port.

12. An internal combustion engine as set forth in claim 11 wherein the time and duration of fuel injection is also varied in response to engine speed and load requirements.

13. An internal combustion engine as set forth in claim 12 wherein the fuel injection initiation is advanced and duration is also increased as the engine speed and load increases.

14. An internal combustion engine as set forth in claim 12 wherein the timing of the fuel injection and exhaust port opening and closing at low load, low speed conditions is such that fuel injection is begun long after the exhaust port is closed and is terminated long before the exhaust port is open.

15. An internal combustion engine as set forth in claim 14 wherein the timing of the fuel injection and exhaust port opening and closing is such that at mid range, mid speed conditions fuel injection begins before the exhaust port is fully closed but is stopped long before the exhaust port again reopens.

16. An internal combustion engine as set forth in claim 15 wherein the timing of fuel injection and exhaust port opening and closing is such that at maximum speed and maximum load fuel is injected during the time when the exhaust port is open but is terminated long before the beginning of the next opening of the exhaust port.

17. An internal combustion engine as set forth in claim 12 wherein the timing of the fuel injection and exhaust port opening and closing is such that at mid range, mid speed conditions fuel injection begins before the exhaust port is fully closed but is stopped long before the exhaust port again reopens.

18. An internal combustion engine as set forth in claim 17 wherein the timing of fuel injection and exhaust port opening and closing is such that at maximum speed and maximum load fuel is injected during the time when the exhaust port is open but is terminated long before the beginning of the next opening of the exhaust port.

19. An internal combustion engine as set forth in claim 12 wherein the timing of fuel injection and exhaust port opening and closing is such that at maximum speed and maximum load fuel is injected during the time when the exhaust port is open but is terminated long before the beginning of the next opening of the exhaust port.

20. A method of operating an internal combustion engine having a combustion chamber, an exhaust port for exhausting gases from the combustion chamber, exhaust port timing means including a valve which progressively opens as the speed and load of the engine increase for effecting a change in the timing when the exhaust port is open, and fuel injection means for injecting fuel directly into the combustion chamber, comprising the steps of interrelating the exhaust port timing means and the fuel injection means for substantially precluding the exit of fuel injected into the combustion chamber from the exhaust port throughout the entire range of speed and load of the engine to produce the desired torque characteristics.

21. A method as set forth in claim 20 wherein the time and duration of fuel injection is also varied in response to engine speed and load requirements.

22. A method as set forth in claim 21 wherein the fuel injection initiation is advanced and duration is also increased as the engine speed and load increases.

23. A method as set forth in claim 21 wherein the timing of the fuel injection and exhaust port opening and closing at low load, low speed conditions is such that fuel injection is begun long after the exhaust port is closed and is terminated long before the exhaust port is open.

24. A method as set forth in claim 23 wherein the timing of the fuel injection and exhaust port opening and closing is such that at mid range, mid speed conditions fuel injection begins before the exhaust port is fully closed but is stopped long before the exhaust port again reopens.

25. A method as set forth in claim 24 wherein the timing of fuel injection and exhaust port opening and closing is such that at maximum speed and maximum load fuel is injected during the time when the exhaust port is open but is terminated long before the beginning of the next opening of the exhaust port.

26. A method as set forth in claim 23 wherein the timing of the fuel injection and exhaust port opening and closing is such that at mid range, mid speed conditions fuel injection begins before the exhaust port is fully closed but is stopped long before the exhaust port again reopens.

27. A method as set forth in claim 26 wherein the timing of fuel injection and exhaust port opening and closing is such that at maximum speed and maximum load fuel is injected during the time when the exhaust port is open but is terminated long before the beginning of the next opening of the exhaust port.

28. A method as set forth in claim 23 wherein the timing of fuel injection and exhaust port opening and closing is such that at maximum speed and maximum load fuel is injected during the time when the exhaust port is open but is terminated long before the beginning of the next opening of the exhaust port.

29. A method as set forth in claim 20 wherein the engine is a reciprocating, two cycle, crankcase compression internal combustion engine having spark ignition and the ignition occurs after fuel injection is completed under at least certain running conditions.

30. A method as set forth in claim 29 wherein under the at least certain running conditions the exhaust port does not open until at least 90° of crankcase rotation after fuel injection has been completed.

31. A method as set forth in claim 30 wherein the exhaust port timing means comprises an exhaust control valve for controlling the effective opening area of the exhaust port.

32. A method as set forth in claim 31 wherein the time and duration of fuel injection is also varied in response to engine speed and load requirements.

33. A method as set forth in claim 32 wherein the fuel injection initiation is advanced and duration is also increased as the engine speed and load increases.

* * * * *